April 16, 1946.　　　H. S. GARABEDIAN　　　2,398,369
SPRAYING APPARATUS
Filed Feb. 11, 1943
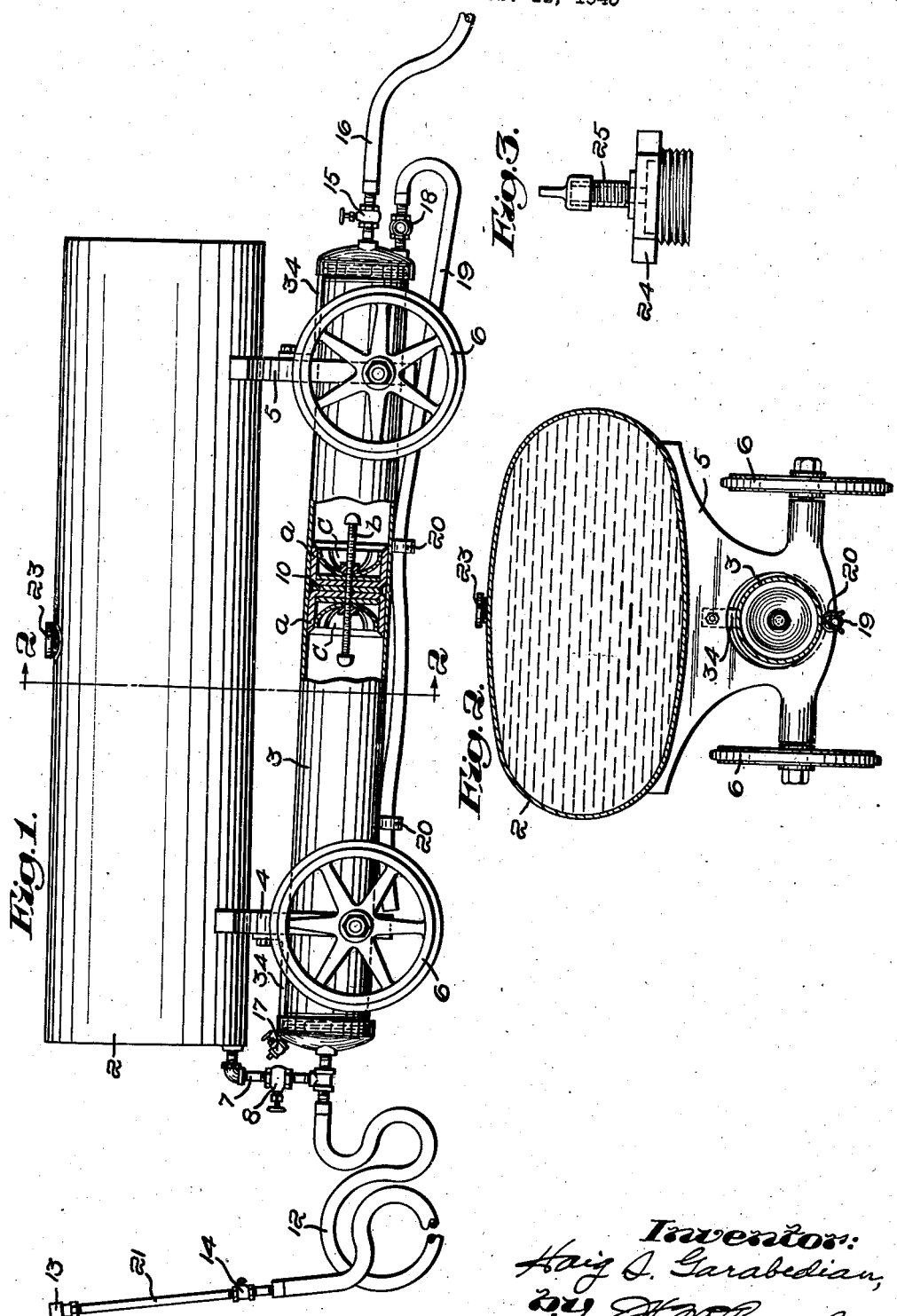
Inventor:
Haig S. Garabedian,
by his Attorney Patented Apr. 16, 1946

2,398,369

UNITED STATES PATENT OFFICE 2,398,369

SPRAYING APPARATUS

Haig S. Garabedian, Watertown, Mass.

Application February 11, 1943, Serial No. 475,495

1 Claim. (Cl. 299—45)

This invention relates to spraying apparatus of the general type used by gardners, horticulturists, orchardists, and others. It is more especially concerned with the requirements of those individuals having relatively small plots of ground under cultivation, so that the expense for a power sprayer is not warranted. In such cases it is common to use either a hand sprayer of the plunger type, or a tank sprayer designed to be carried on the back and to be operated by pressure produced by pumping air into the tank by hand. The first of these types of sprayers is slow and very laborious to use. The second type, while more efficient, still requires hand pumping, and is unsatisfactory because of the gradual reduction in pressure as the spraying operation continues.

The present invention aims to devise a spraying apparatus which will be far easier and more efficient to use than are either of the types above referred to and still will be economical to manufacture.

The nature of the invention will be readily understood from the following description when read in connection with the accompanying drawing, and the novel features will be particularly pointed out in the appended claim.

In the drawing:

Fig. 1 is a side elevation, with some parts broken away, illustrating a spraying apparatus constructed in accordance with my invention;

Fig. 2 is a sectional view taken approximately on the line 2—2, Fig. 1; and

Fig. 3 is a side elevation of a substitute cap for the larger tank shown in Fig. 1.

Referring first to Figs. 1 and 2, the construction there shown comprises a main supply tank 2 and a smaller auxiliary or working tank 3. Both are mounted on a carriage or chassis, which may be of any suitable form, that shown including front and rear frame members 4 and 5 and wheels 6. While the proportions and capacities of these tanks may be made to suit various requirements, it is contemplated that the supply tank will ordinarily hold, say, five or ten gallons and the smaller tank from about three to four quarts. In the particular arrangement shown, the working tank is mounted immediately below the supply tank and the latter is tipped slightly in a forward direction, but this relationship may be varied to suit the requirements of different manufacturers and particularly, where necessary, to lower the center of gravity of the entire assembly, the chief point being that the relationship shall be such as to permit the flow of liquid from the supply tank into the working tank by gravity. For this purpose the two tanks are connected by a short pipe line 7 including a hand-operated valve 8.

Mounted in the tank 3 is a piston 10 freely slidable therein and including oppositely disposed cup-shaped hydraulic washers $a$—$a$ arranged back to back and clamped together on a screw-threaded shaft $b$, the washers preferably being held in an expanded condition by cup-shaped slotted metal springs $c$—$c$.

At one end of the cylinder 3 a spray hose 12 is connected, this hose being equipped with a spray nozzle 13 and preferably, also, with a valve 14. At its opposite end the tank 3 has a valve 15 secured thereto and a hose 16 is connected to it. This hose is intended to conduct water under pressure as, for example, from the municipal water system, or any equivalent source of supply, to the tank. Also, the tank 3 is equipped at one end with a vent cock or valve 17 and at its opposite end with a valve 18 to which one end of a host 19 is secured. Normally this hose extends backwardly under the cylinder 3 and is held releasably thereto by spring clips 20.

Preferably the nozzle 13 includes an elongated tubular section of pipe or tubing 21 which serves as a handle and the valve 14 is mounted in this handle, as shown in Fig. 8. This valve is of the push-button or slidable plunger type and is normally held closed by a spring 22.

In using the apparatus the operator closes the valve 8, introduces the liquid spray mixture into the supply tank 2, or he may perform the mixing operation in this tank, if he wishes. Usually at this time the piston 10 is at the left-hand end, Fig. 1, of the cylinder 3. The operator fills this tank by opening the valve 18 to provide a vent for the air or water in the tank and then opening the valve 8, which allows the solution in the supply tank to flow by gravity into the working tank 3. As it does so, it pushes the piston 10 toward the right until further motion in this direction is stopped by the rounded end of the screw $b$ striking the end of the tank. The vent cock 17 also should be opened at this time to permit the escape of any air trapped in the portion of the cylinder at the left of the piston. When the cylinder has been filled, the operator closes the valves 8 and 18. The hose 16 is assumed to have been connected to a sill cock, or other source of fluid under pressure. Consequently, when the valve 15 is opened this pressure is applied to the piston, thus tending to force it to the left and placing all of the liquid in the working cylinder and in the hose 12 under the pressure of the water supply system. The spraying operation then can be begun simply by adjusting the nozzle, if necessary, and pressing the hand valve 14 on the nozzle handle 12. When the tank 3 is empty, the valve 15 is closed, the valves 8 and 18 are again opened, and the filling operation above described is repeated.

If in connection with mixing a new supply of solution the operator wishes to perform this operation in the tank 2, he can remove the cap 23, close the valve 8, and then fill the tank by taking the hose 19 out of the clips 20, inserting its end in the hole normally closed by the cap 23, and then opening the valves 18 and 15. The other ingredients can be introduced before or after this step.

If a source of water, or other fluid under pressure, is not available, then the apparatus can be used like the usual pressure tank by replacing the cap 23 with the cap 24 shown in Fig. 3. This cap has a filling tube 25 like that with which an automobile inner-tube is equipped and through which air can be pumped into the tank to place the body of liquid therein under pressure. At this time the chamber 3 is not used, although it does become filled with the spraying solution.

While I have herein shown and described a preferred embodiment of my invention, it will be evident that the invention is susceptible of embodiment in other forms without departing from the spirit or scope thereof.

Having thus described my invention, what I desire to claim as new is:

In a spraying apparatus, the combination of a supply tank, a smaller working tank, a discharge hose connected with the forward end of said working tank, a piston slidable backward and forward in the working tank, a valved hose connection at the rearward end of said working tank, a valved pipe connection leading from said supply tank to the forward end of the working tank, a vent valve connected to the rear end of said working tank, and a chassis on which both tanks are mounted for transportation while in cooperative relation to each other, said chassis including a pair of frame members so shaped on their upper edges as to contact the underside of said supply tank and cradle the same, each of said members having an opening therein so positioned below its upper edge as to support said working tank immediately below said supply tank.

HAIG S. GARABEDIAN.